US008413042B2

(12) United States Patent
Holt et al.

(10) Patent No.: US 8,413,042 B2
(45) Date of Patent: Apr. 2, 2013

(54) REFERRER-BASED WEBSITE PERSONALIZATION

(75) Inventors: Alexander Wolcott Holt, New Paltz, NY (US); Carlos A. Hoyos, New York, NY (US); Carl Shawn Kessler, Austin, TX (US); Michael E. Moran, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 12/165,245

(22) Filed: Jun. 30, 2008

(65) Prior Publication Data

US 2009/0327863 A1 Dec. 31, 2009

(51) Int. Cl.
*G06F 17/00* (2006.01)

(52) U.S. Cl. ........................................ 715/234; 715/208

(58) Field of Classification Search .................. 715/205, 715/208, 221, 234
See application file for complete search history.

(56) References Cited

U.S. PATENT DOCUMENTS

| 6,081,835 | A | 6/2000 | Antcliff et al. |
| 6,615,247 | B1 | 9/2003 | Murphy |
| 7,057,591 | B1* | 6/2006 | Hautanen et al. ............... 345/87 |
| 2003/0212594 | A1 | 11/2003 | Hogan |
| 2004/0093327 | A1* | 5/2004 | Anderson et al. ................. 707/3 |
| 2005/0033641 | A1* | 2/2005 | Jha et al. .......................... 705/14 |
| 2005/0076097 | A1* | 4/2005 | Sullivan et al. ............... 709/218 |
| 2005/0102324 | A1 | 5/2005 | Spring et al. |
| 2006/0224689 | A1* | 10/2006 | Leip et al. ..................... 709/217 |
| 2007/0088852 | A1* | 4/2007 | Levkovitz ..................... 709/246 |
| 2007/0143296 | A1 | 6/2007 | Casion |
| 2008/0126515 | A1* | 5/2008 | Chambers et al. ............ 709/218 |
| 2008/0133342 | A1* | 6/2008 | Criou et al. ..................... 705/14 |
| 2009/0024467 | A1* | 1/2009 | Fontoura et al. ................ 705/14 |
| 2009/0024718 | A1* | 1/2009 | Anagnostopoulos et al. 709/218 |

* cited by examiner

*Primary Examiner* — Cesar Paula
*Assistant Examiner* — Howard Cortes
(74) *Attorney, Agent, or Firm* — Patterson & Sheridan, LLP (57) ABSTRACT

Personalization of content of a web site for a user based on a web site that a user arrives from is disclosed. For example, the content of the web site from which the user arrives (i.e., the originating page), as well as the content of the web page the user has arrived to (i.e., the target page), may be categorized as pertaining to particular subjects or topics. Any time a user comes from an originating page, the subject categories for the originating page and the target page may be compared to determine if like categories exist between the pages. In the event that like categories are found, the target page may be personalized based on those categories.

21 Claims, 5 Drawing Sheets

REFERRER-BASED WEBSITE PERSONALIZATION

BACKGROUND OF THE INVENTION

1. Field of the Invention

Embodiments of the invention generally relate to the field of presenting users with content over a network. More specifically, embodiments of the invention relate to a method for referrer-based web site personalization.

2. Description of the Related Art

Web site personalization refers to a process of gathering and storing information about web site visitors, analyzing the information, and delivering appropriate information to each visitor based on the analysis. The objective of collecting visitor information is to develop a profile that describes a site visitor's interests. The most common techniques are explicit profiling, implicit profiling, and using legacy data.

Explicit profiling asks each visitor to fill out information or questionnaires. This method has the advantage of letting customers tell the site directly what they want to see. Once the data is collected, the web site dynamically constructs a personalized Web page accordingly. Implicit profiling tracks the visitor's behavior. This technique is generally transparent to the visitor. Browsing and buying patterns are the behaviors most often assessed. Browsing patterns are usually tracked by saving specific visitor identification and behavior information in a "cookie" stored by the user's browser and updated during each visit. For example, a web site may log each customer's buying history and, based on that history, recommends specific purchases. Recommendations may also be made based on users sharing similar profile characteristics.

Legacy data refers to information about an individual not directly related to a profile or a web visit. Using legacy data accesses legacy data for valuable profile information, such as credit applications and previous purchases. For existing customers and known visitors, legacy data often provides a rich source of profile information. At the same time, personalizing a web site is difficult for a first-time (or relatively new) visitor, where minimal or no profile information or visitor behavior has previously been gathered.

SUMMARY OF THE INVENTION

One embodiment of the invention includes a method for personalizing content of an electronic document. The method may generally include receiving a request for a first electronic document. The request may include an indication of a second electronic document, and the second electronic document may include a reference to the first electronic document. The method may further include retrieving a copy of the second electronic document, determining one or more categories related to content of the second electronic document, and personalizing one or more elements of the first electronic document based on the identified one or more determined categories. The method may also include responding to the request by transmitting the personalized first electronic document to a requesting entity.

Still another embodiment of the invention includes a computer-readable storage medium containing a program, which, when executed by the computer performs an operation for personalizing content of an electronic document. The operation may generally include receiving a request for a first electronic document. The request may include an indication of a second electronic document, and the second electronic document may include a reference to the first electronic document. The operation may further include retrieving a copy of the second electronic document, determining one or more categories related to content of the second electronic document, and personalizing one or more elements of the first electronic document based on the identified one or more determined categories. The operation may also include responding to the request by transmitting the personalized first electronic document to a requesting entity.

Still another embodiment of the invention includes a system having a processor and a memory containing a program, which, when executed by the processor, is configured to personalize content of an electronic document. The program may be generally configured to receive a request for a first electronic document. The request may include an indication of a second electronic document, and the second electronic document may include a reference to the first electronic document. The program may be further configured to retrieve a copy of the second electronic document and determine one or more categories related to content of the second electronic document. The method may also be configured to personalize one or more elements of the first electronic document based on the identified one or more determined categories and respond to the request by transmitting the personalized first electronic document to a requesting entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention may respond to a users' request for a web page with a personalized version of the requested page. For example, the content of the web page (or site) from which the user arrives from (i.e. an originating or referring page) may be categorized as pertaining to particular subjects or topics. Using this information, the requested page (i.e., a target page) may be customized based on the categorization. Further, when a user navigates from the originating page to the target page, the subject categories assigned to the originating page and the target page may be compared to determine if content relevant to the subject categories is available to include in the target page. In the event like categories are found, the target page may be personalized based on those categories. For example, advertising banners may be selected that are relevant to the categories assigned to the originating page. Similarly, content relevant to the categories of the originating page that might otherwise be omitted or available at a deeper linking level on the web-site may be highlighted to the user or featured prominently in the target page.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the computing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. In this regard, references to particular definitional languages, such as HTML and XML, are merely illustrative. Is broadly contemplated that the invention is applicable regardless of the particular schema or language used to defined network resource content.

Figure 1:
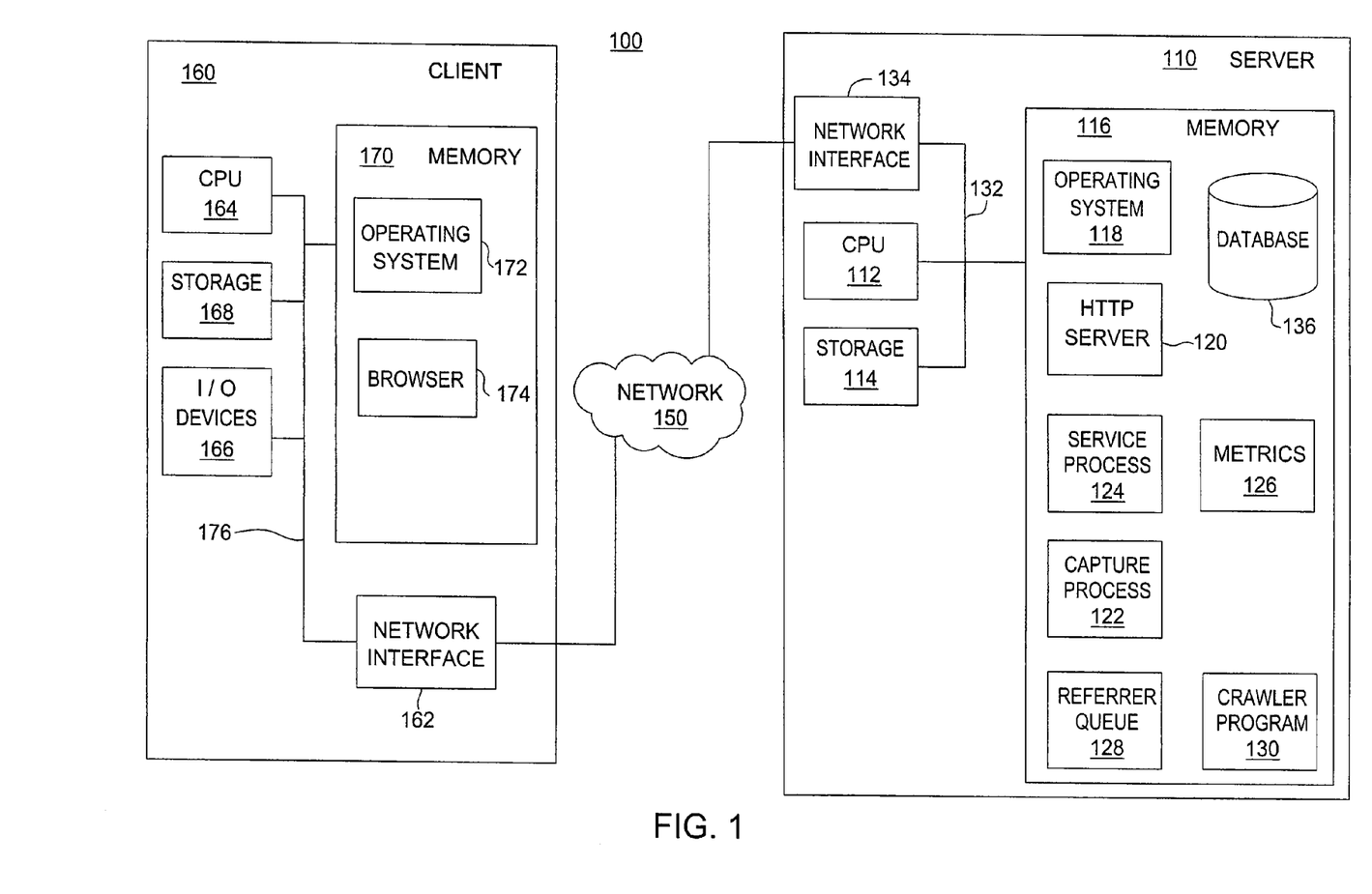
FIG. 1 is a block diagram illustrating an exemplary computing environment, according to one embodiment of the invention.

FIG. 1 is a block diagram illustrating an exemplary computing environment 100 in which embodiments of the present invention may be used. In general, the computing environment 100 includes a client (e.g., a user's) computer 160, and a server computer 110. The client computer 160 and the server computer 110 may be components of the same computer system or may be connected via a network 150, such as the Internet.

As shown, the client computer 160 includes a central processing unit (CPU) 164 connected to a memory 170, storage 168, and input device and output devices 166 via a bus 176. CPU 164 is included to be representative of a single CPU, multiple CPUs, a single CPU having multiple processing cores, and the like. Storage 168 stores application programs and data for use by computer system 160. Examples of storage 168 include one or more hard-disk drives, flash memory devices, optical media and the like. Client computer 160 may be connected to a data communications network 150 (e.g., a local area network, which itself may be connected to other networks such as the internet).

Memory 170 can be one or a combination of memory devices, including random access memory, nonvolatile or backup memory, (e.g., programmable or flash memories, read-only memories, etc.). Additionally, client computer 160 may include input/output devices 166 such as a mouse, keyboard and monitor, as well as a network interface 162 used to connect client computer 160 to network 115.

Illustratively, the memory 170 of client computer 160 stores an operating system 172 used to manage hardware and software executing on the client computer 160. As shown, memory 170 also includes a browser program 174 which, when executed by CPU 164, provides support for navigating between various servers and locating network addresses at one or more of servers (e.g., server computer 110).

Similar to client computer 160, the server computer 110 generally includes a CPU 112, a memory 116, a network interface device 134, and a storage device 114, coupled via a bus 132. Memory 116 is a random access memory sufficiently large to hold the necessary programming and data structures that are located on the server computer 110. As shown, memory 116 stores an operating system 118 used to manage server hardware and software executing on the server computer 110.

Illustratively, memory 116 also includes a hypertext transfer protocol (http) server process 120 configured to service requests from the client computer 160. For example, process 120 may respond to requests for access to electronic resources (e.g., HTML documents, network information, and the like) residing on the server 110. However, one of ordinary skill in the art will recognize that the http server process 120 is merely illustrative and embodiments of the invention may be adapted to support both known and unknown protocols. The programming and data structures of the http server process 120 may be accessed and executed by the CPU 112 as needed during operation. The server computer 110 may also include a network interface device 134 connecting server computer 110 to the network 150. (e.g., an analog modem, a wired network card, or a wireless network device).

In one embodiment, a request for an electronic resource (e.g., an HTML document) received by the http server process 120 may indicate a location which the user is navigating from, e.g., the request may include a referring network address such as a Uniform Resource Locator (URL). For example, a user may visit a website which includes hyperlinks to web pages available from the server computer 110. In the event a user clicks on such a hyperlink, the browser 174 sends a request to the server 110 for a webpage referenced in the hyperlink and located on the server 110. Additionally, the request transmitted to the server 110 may include the URL of the website the user is currently browsing (hereinafter, an originating page). That is, the address of the originating page may be forwarded (i.e., referred) to the server 110 as part of the request.

In one embodiment, the browser 174 running on the client computer 160 may be configured to provide the URL (hereinafter, "referral URL") to the server 110 as part of a request for a page hosted by server 110. In such a case, when sending a request to view a webpage located on the server 100 (hereinafter, "target page"), the browser 174 stores the referral URL in a field of an http header as part of request. As known, an http request may include multiple headers. One such header is called a referrer header, which identifies the URL that links to the target page located on the server 110. Thus, by storing the address of the originating page in the referrer header, the server 110 can determine the website from which the user is navigating from (i.e., the originating page).

The server 110 may use the referral URL to perform functions known in the art such as logging, optimized caching, etc. In one embodiment, the server 110 may also personalize the requested page based on an analysis of the page referenced by the referral URL. To perform this function, in one embodiment, the memory 116 of the server 110 may include a capture process 122, a service process 124, a referrer queue 128, a crawler program 130, and a set of metrics 126. Each of these processes is described in greater detail below.

In one embodiment, the capture process 124 may be configured to analyze and categorize content located on the target page as pertaining to a particular subject or topic. For example, the capture process 124 may employ the crawler program 130, and the crawler program 135 may access the content hosted by the target site and provide the content to the capture process 124 for categorization as pertaining to a particular subject or topic. That is, the crawler program 130 and capture process 124 may analyze web pages (or other content) available on server system 110. Once categorized, web pages served in response by server system 110 may be personalized to match content categories of the originating site. The crawler program 135 may also access the website (hereinafter "target site") associated with the target page, or pages linked to by the target site. In this way, a broader range of subjects or topics may be categorized.

Further, the capture process may store the categories of the target site in a database 136. In one embodiment, the crawler program 130 and capture processes 122 may categorize the target site when the target site is first hosted by server system 110. Additionally, the crawler program 130 and capture process 122 may categorize the target site periodically to account for changes made to the target site over time.

Another function of the capture process 122 may be to capture the referral URL for each user that visits the target page. For example, the capture process 122 may parse an http request to identify a referrer header included in the request. Once the referral URL is identified, the capture process 122 may employ the crawler program 130 to access and analyze content on the referring page. Further, content on the referring page may be categorized as pertaining to a particular subject or topic. Of course, those ordinarily skill in the art will recognize that many techniques may be used to determine a category of a webpage. For example, a category of a website may be determined from the frequency of words, the proximity of words, and/or any associated metadata of a word appearing on a website.

Once a referring page is categorized, the capture process 122 may store the categories of the referring page, along with the associated referring URL, in the database 136. Once the referring URL is captured, and the categorizations of both the target page/site and the referring page are determined, the service process 124 may personalize the target page based on a request to view the target page form a particular originating site. That is, the content ultimately served to the requesting browser may be personalized based on content included on the referring page. In one embodiment, the capture process 122 and service process 124 may be performed in real-time. That is, when a user visits the target page, the capture process 122 may retrieve and categorize the referring page dynamically, and the service process 124 may personalize the target page based on those categorizations for the user on that visit. Thus, should the same user navigate to the target page from different originating pages, the content may differ in that, in each case, the content may be personalized based on the different originating pages.

While the user navigates pages available from the target site, the service process 124 may also collect a set of metrics 126. In one embodiment, metrics 126 may reflect activity performed by a user on the target page. For example, the target page may be a "home page" for a given site and include links to a variety of additional content available from the given site. In such a case, the visiting user's navigation activity may be captured by metrics 126. In one embodiment, this information may be used to determine whether content that was personalized based on a referring page is, in fact, useful to the visiting user. For example, if a page is personalized with links to information related to the categorization of the referring page, and if the user accesses such links, then the personalization may have been useful. Conversely, if the user does not access any of the personalized content, then the categorization of the target page (or the personalized content associated with that categorization) may need to be updated. Actions relating to the service process 124 and the set of metrics 126 are further described below with reference to FIG. 3.

In one embodiment, the categorization of a referring page may occur in an off-line process. That is, the categorization may occur after a user has visited the target page. In such a case, any personalization available for the target page (based on a given referring page) may be viewed during a subsequent visit to the target page (again, when visited from the referring page).

During the off-line process, the URLs of various referring pages may be stored in the referral queue 128. In one embodiment, the referral queue 128 may impose a prioritization scheme, where the referral URL with the highest priority is chosen to be categorized first. In one embodiment, the prioritization scheme may be based on the number of times users arrive from a referring URL. For example, if it is determined that the majority of users to the target page arrive from a particular referring page, the associated referring URL for that referring page may be given a higher priority in the queue.

Once a referral URL is chosen for categorization, the crawler program 130 may access the referring URL on the network 150. Subsequently, the crawler program 135 may retrieve the information located at the referring URL so that the capture process 122 may categorize the content of a given referring page, as discussed above.

In one embodiment, content located on the referring page may be manually categorized. For example, a human classifier might be shown the referring page and select the categories for the page. In another embodiment, the capture process 122 may attempt to categorize the referring page and notify the human classifier of the categorizations made. The human classifier may then have the option to keep the categorizations or modify the categorizations.

In another embodiment, referring pages may be categorized using various classification techniques known in the art (e.g., social tagging, social bookmarking, or folksonomies, or other semantic analysis techniques, e.g., neural nets, a term ontology, etc.). In such a case, a plurality of subjects or topics of a referring page may be presented to a plurality of human classifiers. Each human classifier may vote to select the topics or subjects of the referring page. The topics or subjects that garner the most votes may be designated as the categories of the referring page.

In one embodiment, when a user visits a target page, the capture process 122 may query the database 136 to determine whether the referral URL has been previously stored in the database 136. If so, the capture process 122 may use the previously-determined categories of the originating page stored in the database, bypassing a real-time categorization performed by the capture process 122. That is, because the categories of the originating page are already determined, it may not be necessary to re-categorize the referring page. Frequently, however, content available on the referring page changes over time. Therefore, when a user visits the target page from an originating page, the referral URL may be placed in the referrer queue 128. In this way, a future categorization of the originating page may be scheduled. In doing so, the database 136 may be periodically updated with changes in categorizations of the referring page.

Figure 2:
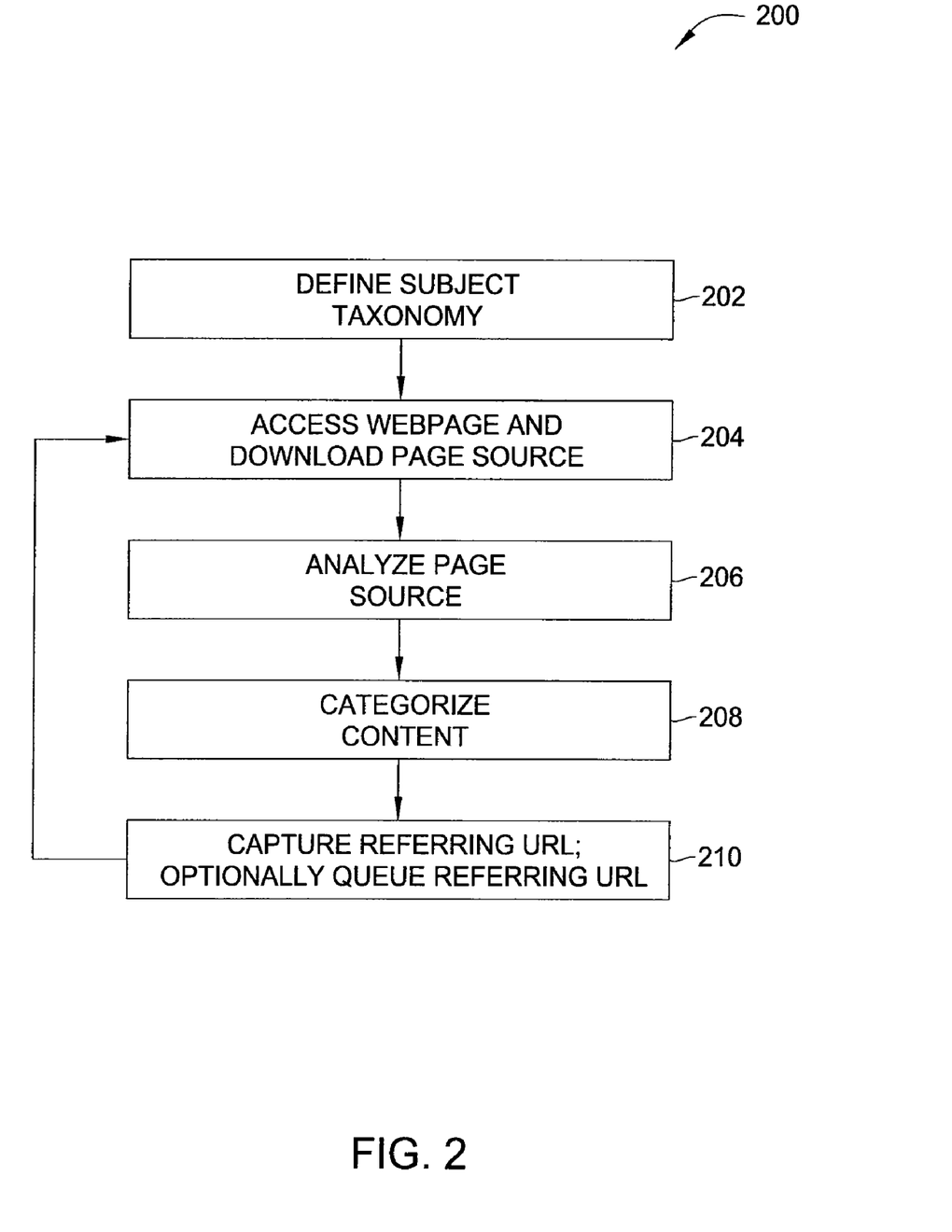
FIG. 2 is a flowchart illustrating a method for categorizing content of a webpage, according to one embodiment of the invention.

FIG. 2 is a flowchart illustrating a method 200 for categorizing content available at a given web site, according to one embodiment of the invention. As shown, the method 200 begins at step 202, where a user may specify a subject taxonomy used to categorize terms present on both the target site (i.e., the content hosted by server 111) as well as on target sites identified in a referring URL. Generally, the subject taxonomy may define a set of related vocabulary terms indicating how various families of words are related to categories specified by the taxonomy. Thus, the subject taxonomy may be used as a basis for categorizing content available from the target site as well from referring web pages.

In one embodiment, prior to personalizing content based on a referring page, the crawler program 130 is used to access and categorize content available on the target site. Accordingly, at step 204, content available may be accessed by the crawler program 130. At step 206, the page source may be analyzed to identify what terms are used in the content accessed at step 204. At step 208, the terms are categorized, e.g., based on the subject taxonomy. That is, the page may be designated as containing content related to one or more subject categories.

In one embodiment, the categories of the target site may be determined using words which occur above a predefined frequency within the text of the target site. Determining a category of the target site may also be accomplished by ascertaining where a word is located within a webpage of the target site. For example, words located in headers or titles may be more indicative of the subject or topic of a web page and therefore may be considered a category for the web page. Thus, a weighting system may be used such that words located in designed key locations (e.g., titles) are given more weight as a category than words in a paragraph. If a word has a sufficient cumulative score (determined by adding all the individual weighted scores) then it may be word may be compared to the defined subject taxonomy of the target site. If the word falls within the defined subject taxonomy, then the word is designated as a category for that page. Once the categories for the target site are determined, the categories may be stored in the database 136.

At step 210, the capture process may monitor http requests for the target page and capture the referring URL from the headers as the http server 120 receives the http requests. Once a referring URL is captured, the method returns to step 204. In this case, the associated referring page may be accessed by the crawler program 130, and the page source of the referring page may be retrieved. In one embodiment, at step 210, the referring URLs may be stored in a queue, and access to the referring page (at step 204) may be performed at a later time. In another embodiment, the referring URL may be accessed (at step 204) at the time of capture, and may also be stored in the queue. In the latter case, the categorization of the referring page may be performed in real-time and a future categorization for the referring page may also be scheduled to account for changes made to the referring page over time.

Once the source of the referring page is downloaded (at step 204), the page source is analyzed (at step 206) and the content of the referring page is categorized (at step 208). Subsequently, categories of the referring page, along with the associated referring URL, may be stored in the database 136. In one embodiment, the crawler program 130 may analyze content of the referring page in the same manner as when determining the categories of the target page. Similarly, as discussed above, the categories of the referring page may be determined by a human classifier. Once a referring page is categorized, the method continues to step 210, where additional referring URL's are captured. Accordingly, the associated referring pages of the captured referring URL's are categorized at steps 204-208.

Figure 3:
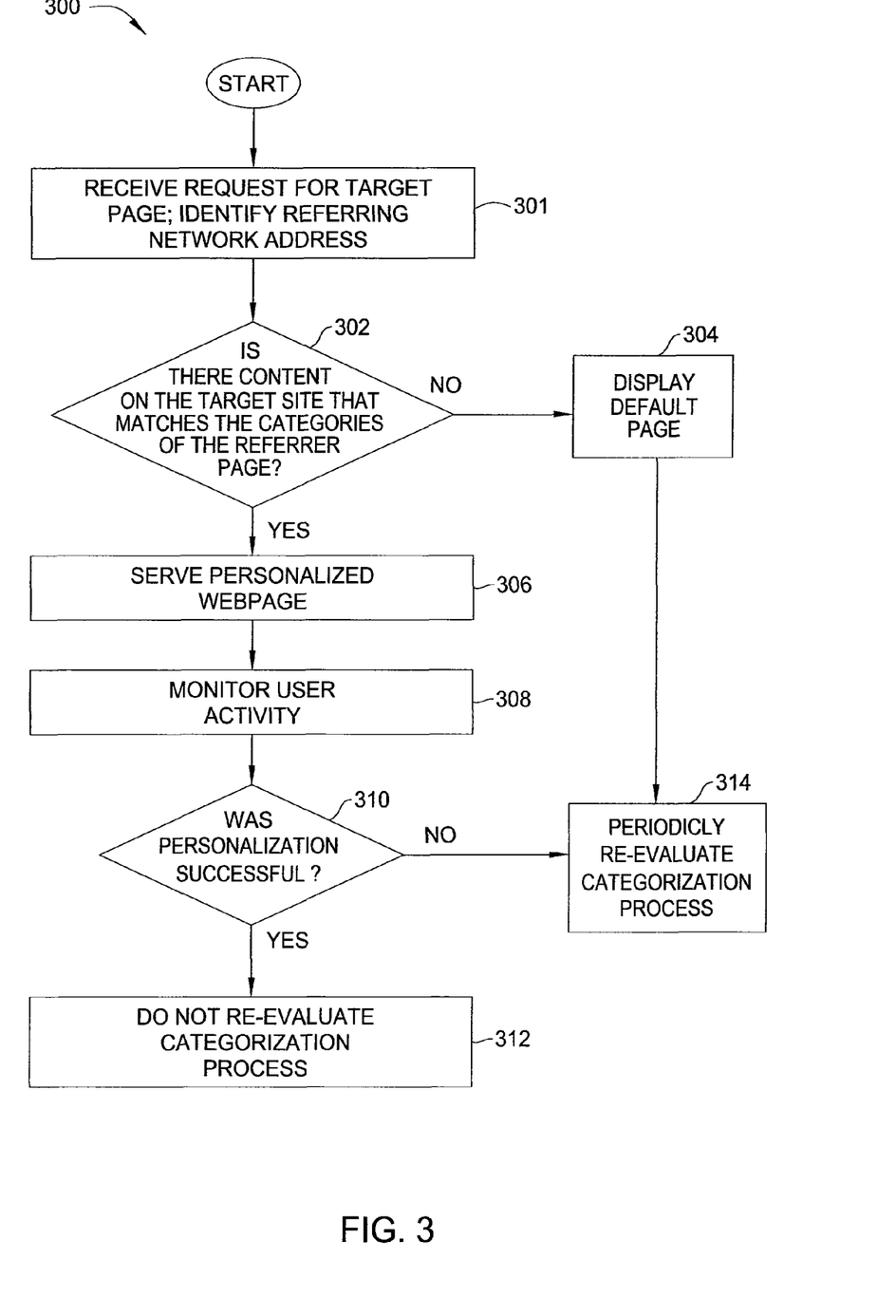
FIG. 3 is a flowchart illustrating a method for personalizing a website, according to one embodiment of the invention.

Once categories of the referring pages are determined, the target page may be personalized, based on a request for the target page originating from a particular referring page. For example, FIG. 3 is a flowchart illustrating a method 300 for personalizing the target page, according to one embodiment of the invention. As shown, the method 300 begins at step 301, where a request for the target page is received. As discussed above, the request may be an http request with a referral header indicating a network address of the referring page. At step 302, the service process 124 determines whether content available on the target site matches the categories of the referrer page. For example, the service process 124 may query the database 136 to retrieve the categories of the referring page and compare this against categories associated with content available form the target site. Alternatively, the content of the referring page may be analyzed and categorized in real-time.

If no content-match is found, the target page is not personalized and a default page of the target site may be displayed (step 304). That is, the content of the requested page may revert to a default collection of content, without any personalization selected based on the content of the referring page. Further, the categorization process may be re-evaluated (at step 314). In one embodiment, the re-evaluation may occur periodically, where the re-evaluation occurs independent of a determination that no content-matches exist between the categories of the target page and the referring page.

A variety of techniques may be used to re-evaluate the categorization of a given referring page. For example, in one embodiment, a complete referring site may be categorized, rather than only categorizing a single referring page. In this case, a larger amount of content may be available for analysis, and therefore, additional (or more accurate) categories may be determined. In another embodiment, the crawler program 130 may also categorize other web pages that are hyperlinked to the referring page.

Referring again to step 302, if a content-match is found between categories associated with the referring page and the target site (i.e., both the referring page and the target site have content under the same category (or categories), then, at step 306, the target page is personalized based on the matched categories. Once the target page is personalized, it may be served to the user (e.g., by an http server) and rendered by a browser program at the client computer. For example, in one embodiment, the target page may display information specific to the matched categories. In another embodiment, the target page may display hyperlinks relating to the matched categories to other web pages (either from the target site or another website). In another embodiment, the target site may display products for sale that are related to the matched categories. An example of target page personalized based off content of a referring page is further described below with reference to FIGS. 4-5.

Additionally, in one embodiment, as the user views the personalized target page, at step 308, a set of metrics 126 may be recorded activity of the user on the target page. For example, the metrics 126 may be used to determine the amount of time spent on the target page. Furthermore, the metrics 126 may be used to monitor what content is accessed from the target page, in particular, whether the user accesses any of the personalized content (e.g., a users clicks a banner add or a link to information selected based on the categorization of the target site).

Using the metrics 126, at step 310, it can be determined if the personalization was either successful or unsuccessful. For example, if the metrics 126 indicate that the user spent little time on the personalized target page (i.e., immediate abandonment of the target page), did not access any of the personalized content, and/or did not purchase any of the products displayed for purchase as a result of the personalization, it may be determined that the personalization was unsuccessful. As a result, the categorization process may be re-evaluated at step 314. On the other hand, if is determined that the personalization was successful (i.e., the user spends a large amount of time on the target page, accesses the personalized content, and/or purchases a product displayed as a result of the personalization), then the categorization process may not be re-evaluated (step 312).

In one embodiment, the metrics 126 may also so be used for future personalization for the target page. For example, the metrics 126 may monitor and maintain a record of the content (personalized and non-personalized) accessed on the target page and/or the target site. Furthermore, the metrics 126 may monitor the time spent or the amount of information accessed regarding the content. Using this record, the metrics 126 may determine that one kind of content is more relevant to a user than another kind of content. Subsequently, the relevant content may be given greater weight than the matched categories between the originating page and elements of the target site during subsequent personalization. That is, the personalization performed in the future may be based more on the relevant content instead of the matched categories between the originating page and the target site.

Figure 4:
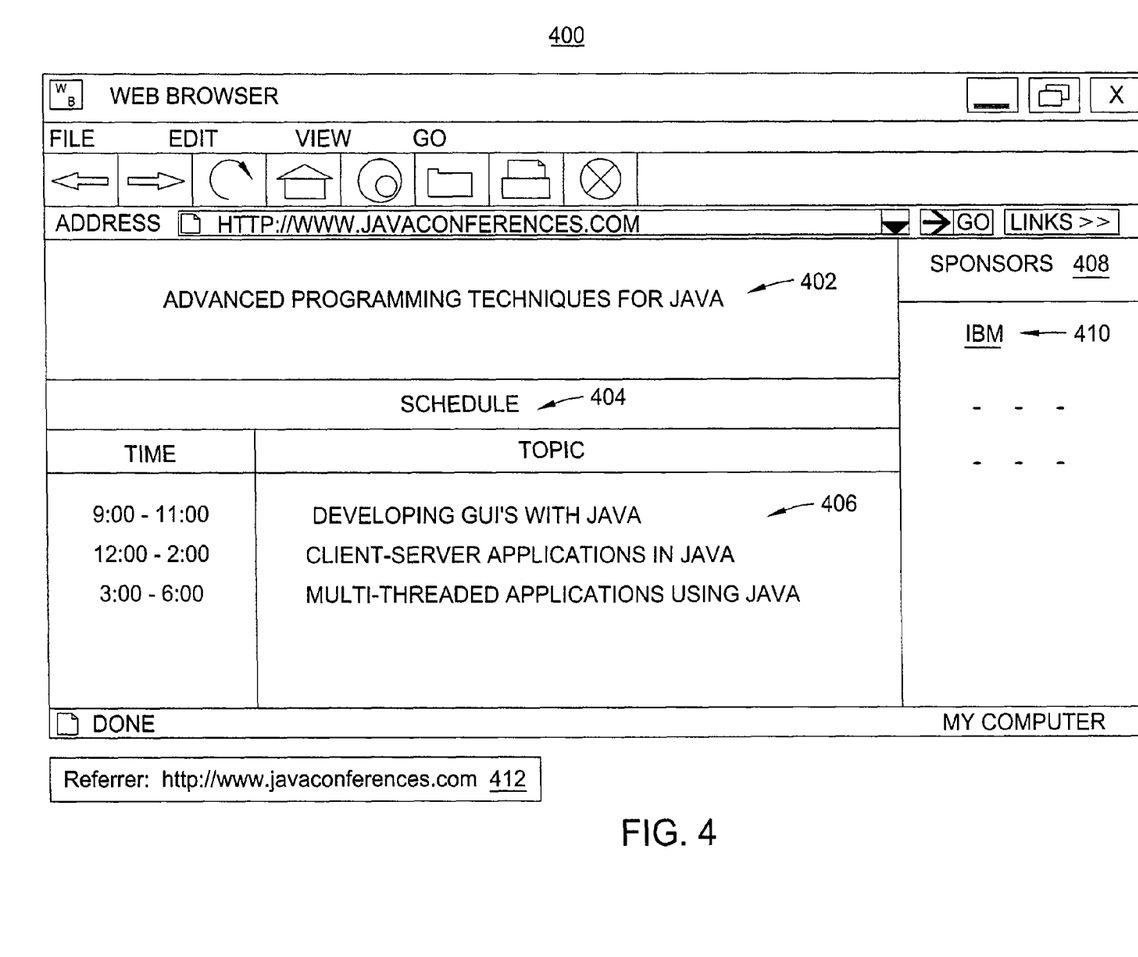
FIG. 4 illustrates an example Hypertext Markup Language (HTML) page for an originating page, according to one embodiment of the invention.

FIG. 4 is an example of an originating page 400 displayed in a browser 174, according to one embodiment of the invention. Illustratively, the originating page 400 is a website presenting details of a conference directed to the Java® programming language. In this example, the originating page 400 displays a title 402 (e.g., "Advanced Programming Techniques for Java"), describing the content of the originating page 400. The originating page 400 also displays a subheading 404 ("Schedule"), followed by a listing 406 of Java-related conferences.

Further, the originating page 400 displays a sponsor section 408 which includes a list of hyperlinks to organizations' websites sponsoring the conferences. Illustratively, IBM is listed as a sponsor and a hyperlink 410 to IBM's website is displayed under the sponsor section.

In some cases, a user may click on the hyperlink 410 to view IBM's website (i.e., the target page). Upon clicking the hyperlink 410, an http request to access IBM's website is sent to an http server 120 hosting IBM's website. Further, the browser 174 may include a referrer header with the http request to supply the http server 120 with the URL of the originating page (i.e., the referrer URL). As an example, FIG. 4 also shows a referrer header 412 modified by the browser 174 to include a referral URL. Accordingly, the referral header 412 is set to the URL of the Java conference web site (http://www.javaconferences.com).

Once IBM's web server receives the http request and captures the referrer URL, the page content served to the user may be personalized, based on the content of the referring webpage (i.e., the "www.javaconferences.com" page). In other words, portions of IBM's website may be personalized based on the content located at the referrer URL. For example, in one embodiment, it may be determined that the categories for the originating page are "Java," "conference," and "multi-threaded." Once the categories of the originating page 400 are determined, some portions of content of the IBM webpage (i.e., the target page) may be personalized of the referring page.

Figure 5:
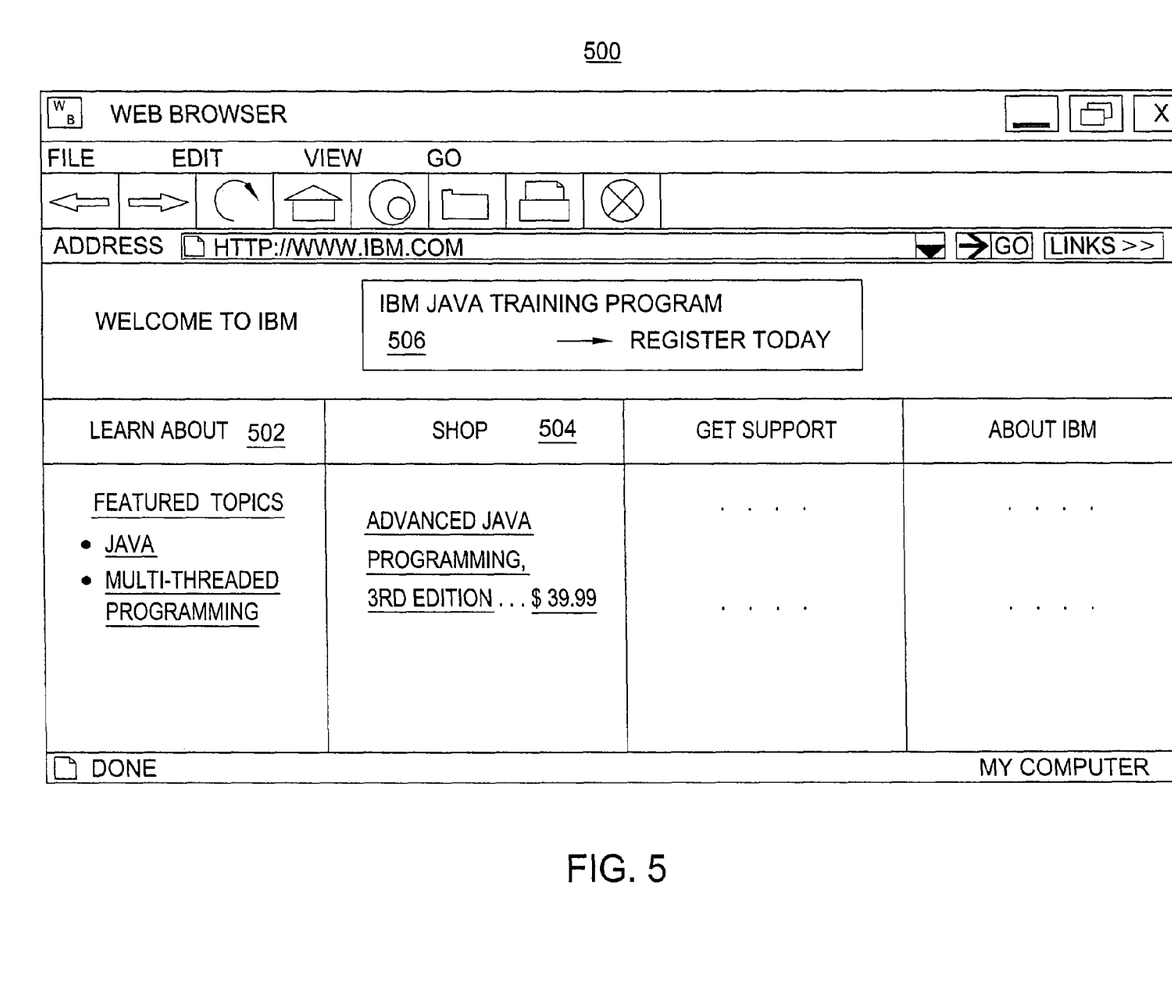
FIG. 5 is an example HTML page personalized in response to an http request from a particular referring page, according to one embodiment of the invention.

FIG. 5 is an example HTML page 500 personalized in response to an http request from a particular referring page, according to one embodiment of the invention. As shown, the page 500 (in the example of FIG. 5, a personalized version of IBM's website) displays content selected using the categories identified on the originating page 400. For example, the website 500 displays personalized content under the "Learn About" sub-heading 502 and the "Shop" sub-heading 504. Specifically, sub-heading 502 displays information (i.e., hyperlinks to other web pages of IBM's site) regarding Java and multi-threaded programming, and sub-heading 504 displays an advertisement for a book ("Advanced Java Programming, $3^{rd}$ Edition") available for purchase the Java programming language. In one embodiment, personalized content may also include advertisements. Accordingly, the target page 500 is also shown displaying a banner advertisement 506 for a Java Training Program.

As this example of FIG. 5 illustrates, a variety of components of the target page 500 may be personalized based on the content of a referring page. In one embodiment, content of a referring page may be retrieved and analyzed to determine one or more categories of content to which the referring page is related. Based on the categories, content served in response to an http request may be personalized. Doing so may improve the relevance of content on the target site, improve the effectiveness of advertisements presented on the target page, and generally, provide users with a better browsing experience.

While the foregoing is directed to embodiments of the present invention, other and further embodiments of the invention may be devised without departing from the basic scope thereof, and the scope thereof is determined by the claims that follow.

What is claimed is:

1. A computer-implemented method for personalizing content of an electronic document, the method comprising:

receiving a request for a first electronic document, wherein the request includes an indication of a second electronic document, and wherein the second electronic document includes a reference to the first electronic document;

retrieving a copy of the second electronic document;

determining a set of one or more categories related to content of the second electronic document by identifying terms in the retrieved copy of the second electronic document;

personalizing one or more elements of the first electronic document based on the identified one or more determined categories;

responding to the request by transmitting the personalized first electronic document to a requesting entity;

monitoring whether the requesting entity accesses the personalized content; and upon determining the requesting entity has not accessed the personalized content, updating the set of one or more categories related to the content of the second electronic document.

2. The method of claim 1, wherein one of the personalized elements of the first electronic document provides content related to one of the determined categories included in the second electronic document.

3. The method of claim 1, wherein at least one of the determined categories is related to a subject, a content type, a language, and a geographical location associated with the second electronic document.

4. The method of claim 1, wherein one of the personalized elements of the first electronic document provides a reference to content related to one of the determined categories.

5. The method of claim 1, wherein one of the personalized elements of the first electronic document includes an advertisement of a product or service related to one of the determined categories.

6. The method of claim 1, further comprising:

in response to receiving the request, adding a source network address associated with the second electronic document to a queue of referring network addresses.

7. The method of claim 1, wherein the request is a hypertext transfer protocol (http) request and wherein the indication of the reference to the first electronic document is included in an http referrer header.

8. A computer-readable storage medium containing a program, which, when executed by the computer performs an operation for personalizing content of an electronic document, comprising:

receiving a request for a first electronic document, wherein the request includes an indication of a second electronic document, and wherein the second electronic document includes a reference to the first electronic document;

retrieving a copy of the second electronic document;

determining a set of one or more categories related to content of the second electronic document by identifying terms in the retrieved copy of the second electronic document;

personalizing one or more elements of the first electronic document based on the identified one or more determined categories;

responding to the request by transmitting the personalized first electronic document to a requesting entity;

monitoring whether the requesting entity accesses the personalized content; and upon determining the requesting entity has not accessed the personalized content, updating the set of one or more categories related to the content of the second electronic document.

9. The computer-readable storage medium of claim 8, wherein one of the personalized elements of the first electronic document provides content related to one of the determined categories included in the second electronic document.

10. The computer-readable storage medium of claim 8, wherein at least one the determined categories is related to a subject, a content type, a language, and a geographical location associated with of the second electronic document.

11. The computer-readable storage medium of claim 8, wherein one of the personalized elements of the first electronic document provides a reference to content related to one of the determined categories.

12. The computer-readable storage medium of claim 8, wherein one of the personalized elements of the first electronic document includes an advertisement of a product or service related to one of the determined categories.

13. The computer-readable storage medium of claim 8, wherein the operation further comprises, in response to receiving the request, adding a source network address associated with the second electronic document to a queue of referring network addresses.

14. The computer-readable storage medium of claim 8, wherein the request is an hypertext transfer protocol (http) request and wherein the indication of the reference to the first electronic document is included in an http referrer header.

15. A system, comprising:

a processor; and a memory containing a program, which, when executed by the processor, is configured to personalize content of an electronic document by performing the steps of: receiving a request for a first electronic document, wherein the request includes an indication of a second electronic document, and wherein the second electronic document includes a reference to the first electronic document;

retrieving a copy of the second electronic document, determining a set of one or more categories related to content of the second electronic document by identifying terms in the retrieved copy of the second electronic document, personalizing one or more elements of the first electronic document based on the identified one or more determined categories, responding to the request by transmitting the personalized first electronic document to a requesting entity, monitoring whether the requesting entity accesses the personalized content, and upon determining the requesting entity has not accessed the personalized content, updating the set of one or more categories related to the content of the second electronic document.

16. The system of claim 15, wherein one of the personalized elements of the first electronic document provides content related to one of the determined categories included in the second electronic document.

17. The system of claim 15, wherein at least one the determined categories is related to a subject, a content type, a language, and a geographical location associated with of the second electronic document.

18. The system of claim 15, wherein one of the personalized elements of the first electronic document provides a reference to content related to one of the determined categories.

19. The system of claim 15, wherein one of the personalized elements of the first electronic document includes an advertisement of a product or service related to one of the determined categories.

20. The system of claim 15, wherein the steps further comprise, in response to receiving the request, adding a source network address associated with the second electronic document to a queue of referring network addresses.

21. The system of claim 15, wherein the request is a hypertext transfer protocol (http) request and wherein the indication of the reference to the first electronic document is included in an http referrer header.

* * * * *